(12) United States Patent
Okamura et al.

(10) Patent No.: US 12,078,079 B2
(45) Date of Patent: Sep. 3, 2024

(54) METHOD FOR MODIFYING BLADES OF FAN, COMPRESSOR, AND TURBINE OF AXIAL FLOW TYPE, AND BLADES OBTAINED BY THE MODIFICATION

(71) Applicant: IHI CORPORATION, Tokyo (JP)

(72) Inventors: Yasuhiro Okamura, Tokyo (JP); Masaaki Hamabe, Tokyo (JP); Daisuke Nishii, Tokyo (JP); Juo Furukawa, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 18/296,576

(22) Filed: Apr. 6, 2023

(65) Prior Publication Data

US 2023/0243264 A1 Aug. 3, 2023

Related U.S. Application Data

(63) Continuation of application No. PCT/JP2021/029885, filed on Aug. 16, 2021.

(30) Foreign Application Priority Data

Dec. 3, 2020 (JP) ................................. 2020-200993

(51) Int. Cl.
*F01D 5/14* (2006.01)
(52) U.S. Cl.
CPC ........ *F01D 5/145* (2013.01); *F05D 2240/304* (2013.01); *F05D 2250/14* (2013.01)
(58) Field of Classification Search
CPC ................................. F01D 5/145; F05D 2240/304
See application file for complete search history.

(56) References Cited

U.S. PATENT DOCUMENTS

| 8,070,454 B1 * | 12/2011 | Rawlings | ................. | F01D 5/288 416/228 |
| 8,794,926 B2 * | 8/2014 | Routier | ................... | F01D 5/141 416/228 |

(Continued)

FOREIGN PATENT DOCUMENTS

| JP | 5-141394 A | 6/1993 |
| JP | 2009-250225 A | 10/2009 |

(Continued)

OTHER PUBLICATIONS

International Search Report issued Oct. 5, 2021 in PCT/JP2021/029885 filed on Aug. 16, 2021, citing documents 1-4, 15-16 therein, 2 pages.

(Continued)

*Primary Examiner* — Michael L Sehn
(74) *Attorney, Agent, or Firm* — Oblon, McClelland, Maier & Neustadt, L.L.P.

(57) ABSTRACT

Provided is a blade capable of optimizing an outflow angle in substantially the entire hub region and tip region, particularly in a blade-end-side hub region and a blade-end-side tip region. The blade includes: a base blade part; a suction-side elevated portion provided on a suction surface near a trailing edge in at least one of the blade-end-side tip region and the blade-end-side hub region of the base blade part; and a pressure-side elevated portion provided on a pressure surface near the trailing edge in at least one of a midspan-side tip region and a midspan-side hub region of the base blade part. An airfoil at each spanwise position where the elevated portion is provided is such that a trailing-edge curve of a base airfoil is changed to a modified trailing-edge curve. The modified trailing-edge curve includes a portion of the trailing-edge curve of the base airfoil in the spanwise region where the elevated portion is provided, the portion being closer to the pressure side or the suction side than the (Continued)

trailing edge, and an elevated portion curve. The elevated portion curve includes a concave front-side curve and a convex rear-side curve.

10 Claims, 9 Drawing Sheets

(56) References Cited

U.S. PATENT DOCUMENTS

| | | | |
|---|---|---|---|
| 9,303,646 B2 * | 4/2016 | Park | F04D 29/282 |
| 10,443,607 B2 | 10/2019 | Brown et al. | |
| 2011/0200442 A1 | 8/2011 | Routier | |
| 2011/0206527 A1 | 8/2011 | Harvey et al. | |
| 2013/0129515 A1 | 5/2013 | Park et al. | |
| 2014/0112795 A1 * | 4/2014 | Hamabe | F01D 5/145 |
| | | | 416/223 R |
| 2015/0233253 A1 | 8/2015 | Hamabe et al. | |
| 2017/0130587 A1 | 5/2017 | Bhaumik et al. | |
| 2020/0157942 A1 | 5/2020 | Furukawa et al. | |

FOREIGN PATENT DOCUMENTS

| | | | |
|---|---|---|---|
| JP | 2012-505340 A | 3/2012 | |
| JP | 2014-88858 A | 5/2014 | |
| JP | 2017-89629 A | 5/2017 | |
| JP | WO2019/064761 A1 | 4/2019 | |

OTHER PUBLICATIONS

Extended European Search Report dated Jul. 11, 2024, issued in European Application No. 21900256.5.

* cited by examiner

METHOD FOR MODIFYING BLADES OF FAN, COMPRESSOR, AND TURBINE OF AXIAL FLOW TYPE, AND BLADES OBTAINED BY THE MODIFICATION

TECHNICAL FIELD

Embodiments described herein relate to a modification method for optimizing outflow angles of blades of a fan, a compressor, and a turbine of axial flow type, and to blades obtained by the modification.

BACKGROUND ART

For example, a fan, a compressor, and a turbine of axial flow type, which are components of a turbofan engine, are each provided with one or more axially arranged stages, and each stage is made up of a rotor blade row formed by a circumferentially spaced arrangement of rotor blades and a stationary blade row formed by a circumferentially spaced arrangement of stationary blades. In the fan and the compressor, the rotor blade row is disposed on the upstream side of each stage, and in the turbine, the stationary blade row is disposed on the upstream side of each stage.

The working fluid (air in the compressor, combustion gas in the turbine) passing through the blade rows (rotor blade row and stationary blade row) flows in an inter-blade channel formed between adjacent blades. The inter-blade channel is bounded by a channel inner wall on the radial inside, by a channel outer wall on the radial outside, and by opposing blade surfaces (pressure surface and suction surface) of adjacent blades on both circumferential sides. In the rotor blade row, generally, the platform of the rotor blade constitutes the channel inner wall, and a casing (or a tip shroud provided at the tip of the rotor blade) constitutes the channel outer wall. In the stationary blade row, generally, the inner band of the stationary blade constitutes the channel inner wall, and the outer band of the stationary blade constitutes the channel outer wall.

In the present specification, the term "blade" is used to describe a blade part (aerofoil) which is a part of a rotor blade or a stationary blade, rather than the whole of the rotor blade or the stationary blade.

It is ideal that the flow in the inter-blade channel is along a solid wall that bounds the periphery of the inter-blade channel. The flow (main flow) in a portion of the inter-blade channel away from the solid wall is close to such an ideal flow, but near the solid wall, a flow different from the ideal flow, that is, a secondary flow, is generated due to the effect of viscosity. The generation of a secondary flow can cause an outflow angle to deviate from a design value, adversely affecting the performance of the blade placed downstream.

As a design method for correcting such deviation of the outflow angle from the design value caused by the secondary flow, there has been proposed a method of providing an elevated portion on the pressure surface near the trailing edge in a hub region or a tip region of the blade (cf. Patent Document 1).

In general, in the hub region and the tip region of the blade, due to the effect of the secondary flow generated near each of the channel inner wall and the channel outer wall, the turning (curving) of the flow cannot be obtained as expected at the time of design in the inter-blade channel, and the outflow angle tends to become locally small.

In the blade designed by the method proposed in Patent Document 1, the elevated portion is provided on the pressure surface near the trailing edge in the hub region or the tip region, and the spanwise distribution of the height of the elevated portion is such that the height is maximum at a spanwise position where the outflow angle becomes locally small. As described above, with the elevated portion being provided on the pressure surface near the trailing edge, the flow on the suction surface side turns around to the pressure surface side along the trailing edge of the elevated portion due to a kind of Coanda effect, and the turning of the flow is increased to increase the outflow angle. As a result, the deviation of the outflow angle from the design value is corrected.

RELATED ART DOCUMENT

Patent Document

Patent Document 1: WO 2019/064761 A1

SUMMARY OF THE DISCLOSURE

Problems to be Solved by the Disclosure

As described above, according to the blade designed by the method proposed in Patent Document 1, the action of increasing the outflow angle can be obtained in the spanwise region where the outflow angle becomes locally smaller than the design value. However, the increase in the outflow angle due to the elevated portion occurs not only in the region where the elevated portion is provided but also in the surrounding region.

In general, among regions of the hub region and tip region of the blade, in regions which are very close to the channel inner wall and the channel outer wall, respectively (the blade-end-side hub region and the blade-end-side tip region, respectively; hereinafter collectively referred to as a blade-end region), the effect of the secondary flow causes the turning (curving) of the flow in the inter-blade channel that exceeds the assumption at the time of design, and the outflow angle tends to become locally large.

Therefore, in the blade designed by the method proposed in Patent Document 1, the outflow angle may become excessive in the blade-end region due to the combination of the increase in the outflow angle caused by the effect of the secondary flow and the increase in the outflow angle caused by the elevated portion.

In the blade designed by the method proposed in Patent Document 1, there is still room to optimize the outflow angle in substantially the entire hub region and tip region, particularly in the blade-end-side hub region and the blade-end-side tip region, through correction of an excessive outflow angle in the blade-end region, as compared with the conventional blade (i.e., the blade without the elevated portion).

The present disclosure has been made in view of the above problem, and an object of the present disclosure is to provide a method for modifying a blade that can optimize an outflow angle in substantially the entire hub region and tip region, particularly in a blade-end-side hub region and a blade-end-side tip region, and a blade obtained by the modification.

Means for Solving the Problems

In order to solve the above problem, a blade of a fan, a compressor, or a turbine of axial type according to a first aspect of the present disclosure includes: a base blade part having a tip region including a blade-end-side tip region and a midspan-side tip region located closer to a blade center than the blade-end-side tip region, and a hub region including a blade-end-side hub region and a midspan-side hub region located closer to the blade center than the blade-end-side hub region; a suction-side elevated portion provided on a suction surface near a trailing edge in at least one of the blade-end-side tip region and the blade-end-side hub region of the base blade part; and a pressure-side elevated portion provided on a pressure surface near the trailing edge in at least one of the midspan-side tip region and the midspan-side hub region of the base blade part. The base blade part has a base airfoil including a leading-edge curve, a trailing-edge curve that is an arc, and a concave pressure-side curve and a convex suction-side curve each extending between the leading-edge curve and the trailing-edge curve at each of spanwise positions. The blade has the base airfoil in a spanwise region where neither the suction-side elevated portion nor the pressure-side elevated portion is provided, a modified suction-surface airfoil in a spanwise region where the suction-side elevated portion is provided, and a modified pressure-surface airfoil in a spanwise region where the pressure-side elevated portion is provided. The modified suction-surface airfoil includes the leading-edge curve, the pressure-side curve and the suction-side curve of the base airfoil in the spanwise region where the suction-side elevated portion is provided, and a modified suction-surface trailing-edge curve. The modified pressure-surface airfoil includes the leading-edge curve, the pressure-side curve and the suction-side curve of the base airfoil in the spanwise region where the pressure-side elevated portion is provided, and a modified pressure-surface trailing-edge curve. The modified suction-surface trailing-edge curve includes a portion of the trailing-edge curve of the base airfoil in the spanwise region where the suction-side elevated portion is provided, the portion being closer to the pressure-side curve than the trailing edge, and an elevated portion curve. The modified pressure-surface trailing-edge curve includes a portion of the trailing-edge curve of the base airfoil in the spanwise region where the pressure-side elevated portion is provided, the portion being closer to the suction-side curve than the trailing edge, and an elevated portion curve. The elevated portion curve includes a concave front-side curve and a convex rear-side curve.

Effects of the Disclosure

According to the present disclosure, it is possible to obtain an excellent effect that the outflow angle can be optimized in substantially the entire hub region and tip region, particularly in the blade-end-side hub region and the blade-end-side tip region, only by adding the elevated portion to the base blade, and that it is possible to avoid spending much time for repeatedly performing aerodynamic analysis and structural strength analysis because there is no need to change the aerodynamic design of the base blade.

MODE FOR CARRYING OUT THE DISCLOSURE

Hereinafter, an embodiment of the present disclosure will be described in detail with reference to the accompanying drawings.

Figure 1A:
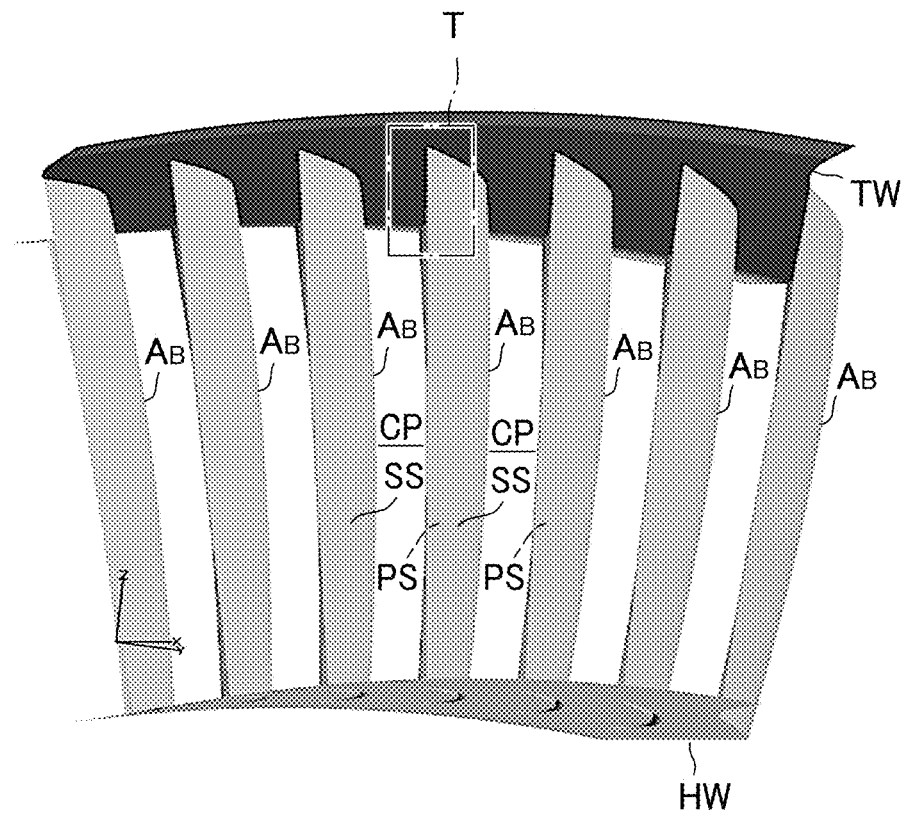
FIG. 1A is a schematic perspective view of a blade row made up of blades to be moving blade modified according to a method of an embodiment of the present disclosure, that is, base blades, as viewed from the rear side (downstream side).
Figure 1B:
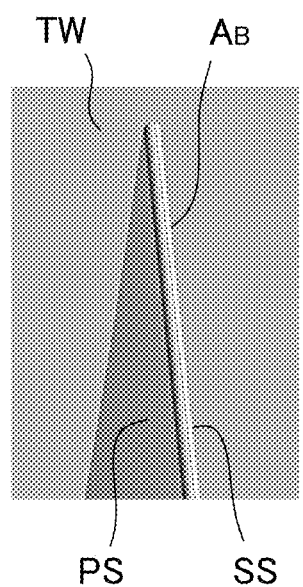
FIG. 1B is an enlarged view of a T portion in FIGS. 1A and 1s a perspective view of the tip region of the base blade as viewed from the rear side (downstream side).
Figure 1C:
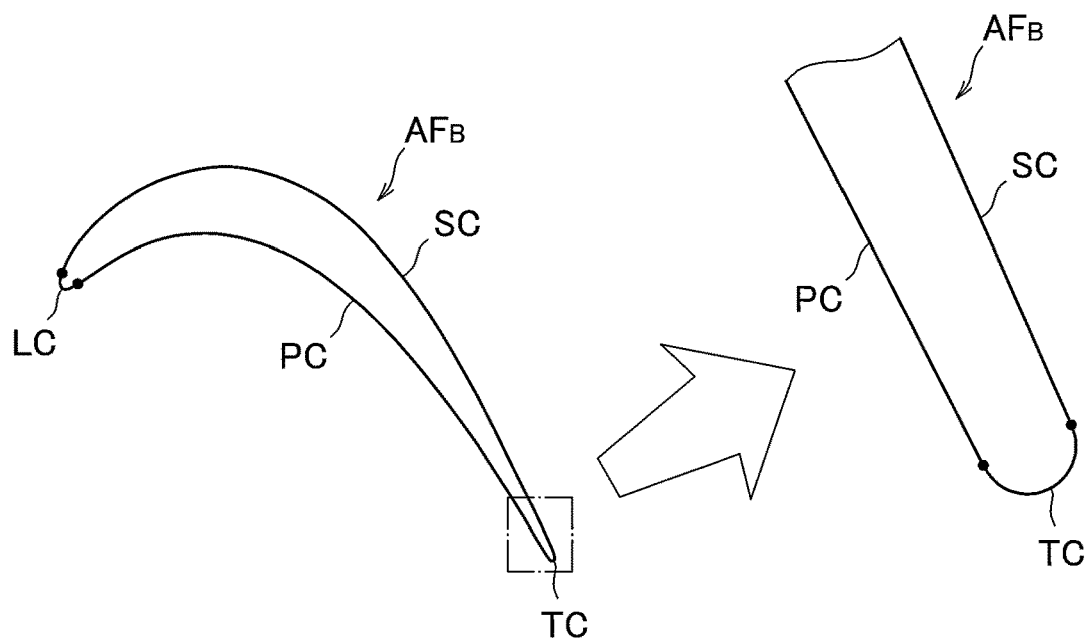
FIG. 1C is a view illustrating a cross-sectional shape (airfoil) of the base blade.

FIGS. 1A to 1C are views for explaining a blade to be modified by the method of the embodiment of the present disclosure, that is, a base blade $A_B$. FIG. 1A is a schematic perspective view of a blade row made up of the base blades $A_B$ as viewed from the rear side (downstream side), FIG. 1B is an enlarged view of a T portion in FIGS. 1A and 1s is a perspective view of the tip region of the base blade $A_B$ as viewed from the rear side (downstream side), and FIG. 1C is a view illustrating a cross-sectional shape (airfoil) of the base blade $A_B$. Here, a case where the base blade $A_B$ is a stationary blade of a low-pressure turbine forming a turbofan engine will be described as an example.

The term "airfoil" is generally used to describe a shape (i.e., a single shape) in a section of a blade, but in the present specification, the term "airfoil" is used to describe a set of shapes in respective sections of a blade having predetermined features. The terms "base airfoil" and "modified airfoil", which will be described later, are also used in this sense.

As illustrated in FIG. 1A, the base blades $A_B$ are circumferentially arranged at equal intervals between a channel outer wall TW and a channel inner wall HW to form a blade row. At this time, inter-blade channels CP are each formed between the opposed blade surfaces (pressure surface PS and suction surface SS) of the adjacent base blades $A_B$.

Here, the base blade $A_B$ is a blade designed by an arbitrary method and may be either a two-dimensionally designed blade or a three-dimensionally designed blade. In addition, not only a newly designed blade but also an existing blade can be used as the base blade $A_B$.

The base blade $A_B$ has a base airfoil $AF_B$ having the following feature with respect to the combination of configuration curves at each spanwise position. That is, as illustrated in FIG. 1C, the base airfoil $AF_B$ is formed of a leading-edge curve LC, a trailing-edge curve TC, and a concave pressure-side curve PC and a convex suction-side curve SC each extending between the leading-edge curve LC and the trailing-edge curve TC. The trailing-edge curve TC is formed as an arc. In FIG. 1C, the end of each curve described above (i.e., the connection between two adjacent curves) is indicated by a dot for convenience (the same applies to FIGS. 5A to 5C and 6A to 6C to be described later).

As described above, the base blade $A_B$ has the same airfoil (base airfoil $AF_B$) at all spanwise positions. That is, the base blade $A_B$ has the same airfoil (base airfoil $AF_B$) in the tip region illustrated in FIG. 1B as in the other regions.

The flow in the inter-blade channel CP of the blade row made up of the base blades $A_B$ was analyzed using computational fluid dynamics (CFD) considering the effect of viscosity, and a spanwise distribution of an outflow angle was obtained. The result thereof is illustrated in FIG. 2.

Figure 2:
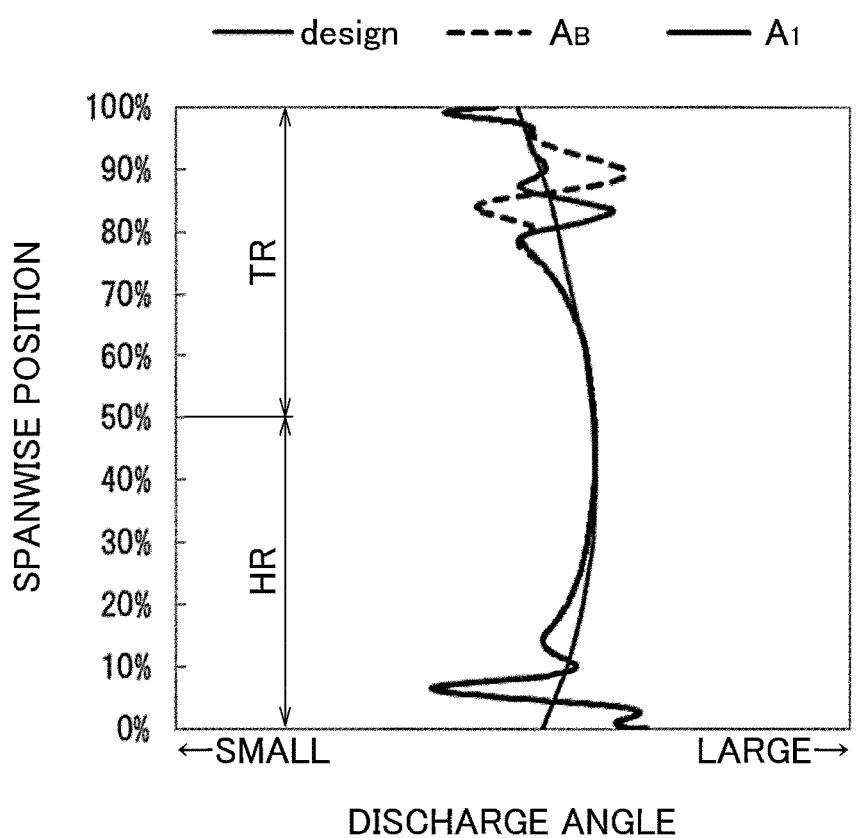
FIG. 2 is a view illustrating a spanwise distribution of an outflow angle obtained by analyzing a flow in an inter-blade channel of a blade row made up of each of the base blades and blades modified by the method of the embodiment of the present disclosure.

FIG. 2 illustrates the spanwise distribution of the outflow angle at the blade outlet (downstream of the trailing edge). Note that the spanwise position plotted on the vertical axis is a dimensionless value, obtained by dividing the height measured from the hub-side end of the blade by the total height of the blade (the height from the hub-side end to the tip-side end) (the value is expressed as a percentage in the graph). As illustrated in the drawing, in the present specification, regions where distances from the hub-side end are 0 to 50% and 50 to 100% of the total span are referred to as a hub region HR and a tip region TR, respectively.

As illustrated in FIG. 2, at the approximately 6% span position of the hub region HR and at the approximately 84% span position of the tip region TR, the outflow angle of the base blade $A_B$ is much smaller than the design value (design), while on the side closer to the channel inner wall HW than the approximately 4% span position of the hub region HR and at the approximately 90% span position of the tip region TR, the outflow angle of the base blade $A_B$ is much larger than the design value (design). These are because the turning (curving) of the flow in the inter-blade channel CP is not as expected at the time of design due to the effect of secondary flow generated near the channel inner wall HW and the channel outer wall TW, and the outflow angle locally deviates from the design value. Such deviation of the outflow angle from the design value may adversely affect the performance of the blade placed downstream.

Therefore, it is preferred that the outflow angle, which locally deviates from the design value in the hub region HR and the tip region TR, as described above, be brought closer to the design value.

In the method for modifying the blade according to the embodiment of the present disclosure, an elevated portion is provided on the pressure surface near the trailing edge of the base blade around a spanwise position where the outflow angle is minimal below the design value, and an elevated portion is provided on the suction surface near the trailing edge of the base blade around a spanwise position where the outflow angle is maximal above the design value. The concept of such modification is illustrated in FIGS. 3A and 3B.

Figure 3A:
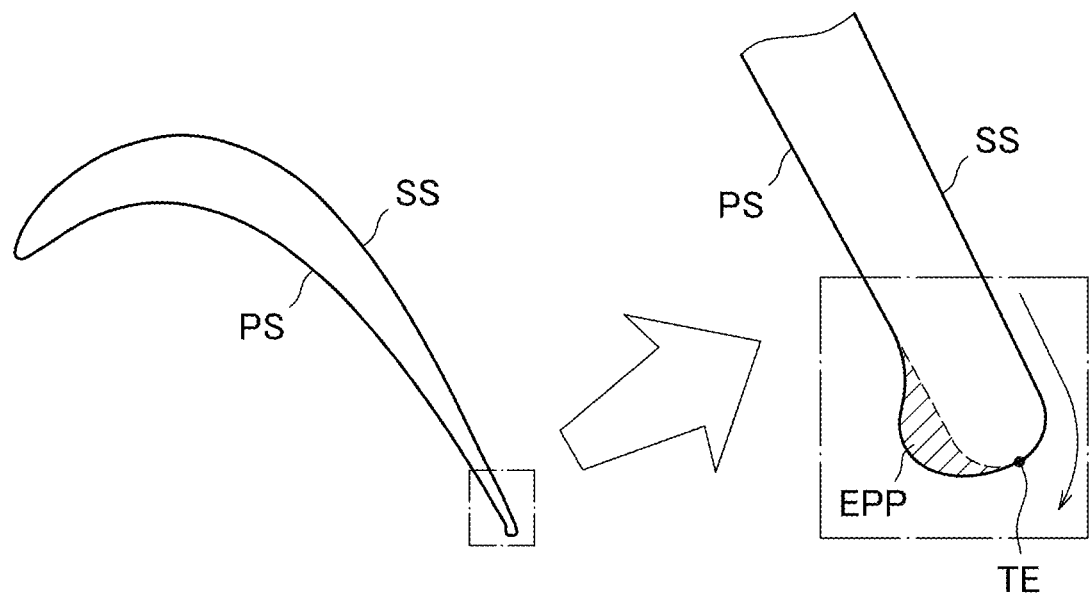
FIG. 3A is a view for explaining the concept of the modification according to the method of the embodiment of the present disclosure, illustrating an elevated portion provided on the pressure surface near the trailing edge of the blade.

As illustrated in FIG. 3A, in the spanwise region where the outflow angle is below the design value, a pressure-side elevated portion EPP is provided on the pressure surface PS near a trailing edge TE. This causes a kind of Coanda effect, and the flow on the suction surface SS side turns around to the pressure surface PS side along the trailing edge of the pressure-side elevated portion EPP as indicated by an arrow. It is considered that as a result, the turning (curving) of the flow becomes larger, and the outflow angle increases and approaches the design value.

Figure 3B:
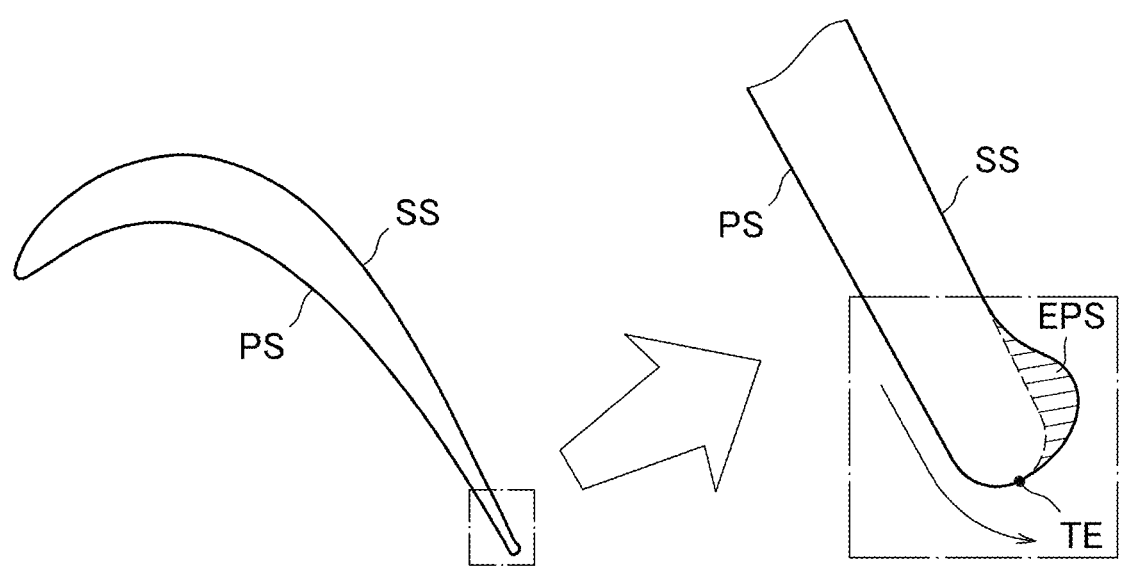
FIG. 3B is a view for explaining the concept of the modification according to the method of the embodiment of the present disclosure, illustrating an elevated portion provided on the suction surface near the trailing edge of the blade.

Further, as illustrated in FIG. 3B, in the spanwise region where the outflow angle exceeds the design value, a suction-side elevated portion EPS is provided on the suction surface SS near the trailing edge TE. This causes a kind of Coanda effect, and the flow on the suction surface PS side turns around to the suction surface SS side along the trailing edge of the suction-side elevated portion EPS as indicated by an arrow. It is considered that as a result, the turning (curving) of the flow becomes smaller, and the outflow angle decreases and approaches the design value.

Next, referring to FIGS. 4A to 4B and 5A to 5C, a blade (modified blade) A obtained by modifying the base blade $A_B$ by the method described above will be described in detail.

Figure 4A:
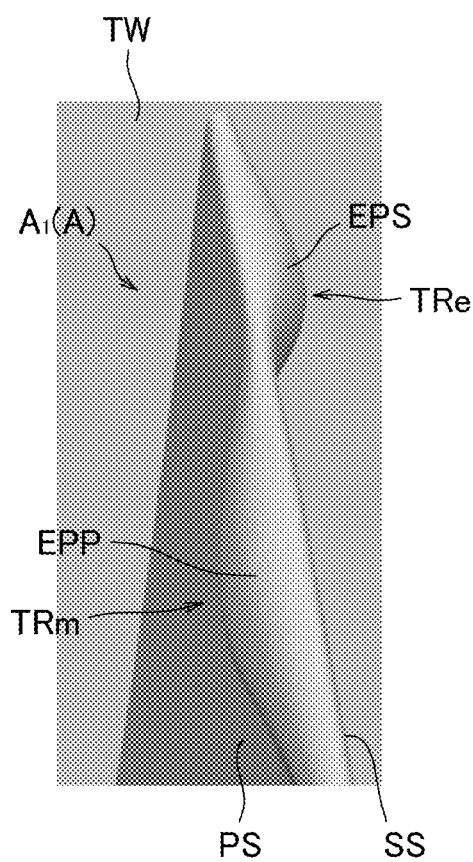
FIG. 4A is a view for explaining the blade modified by the method of the embodiment of the present disclosure and is a perspective view (corresponding to FIG. 1B for the base blade) of a tip region of a first modified blade as viewed from the rear side (downstream side).
Figure 4B:
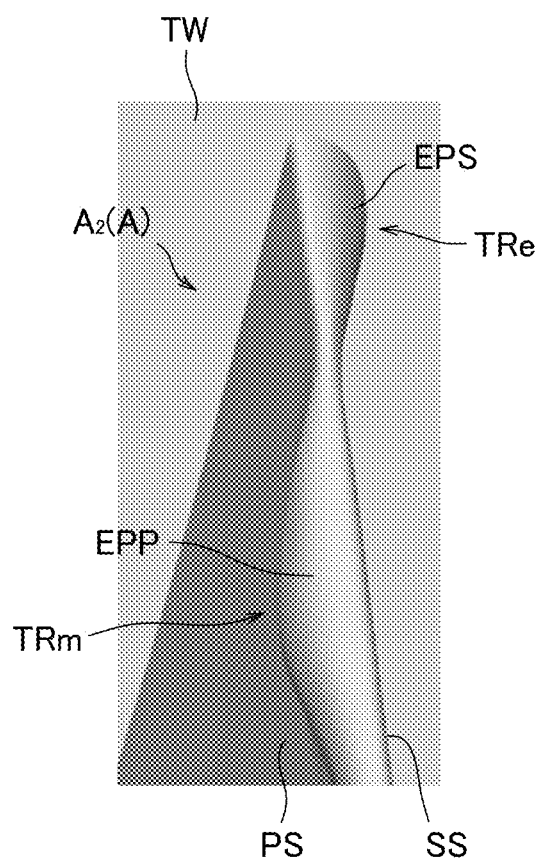
FIG. 4B is a view for explaining the blade modified by the method of the embodiment of the present disclosure and is a perspective view (corresponding to FIG. 1B for the base blade) of a tip region of a second modified blade as viewed from the rear side (downstream side).

FIGS. 4A and 4B are perspective views of tip regions of a first modified blade $A_1$ and a second modified blade $A_2$ as viewed from the rear side (downstream side), respectively, and are views corresponding to FIG. 1B for the base blade $A_B$.

Figure 5A:
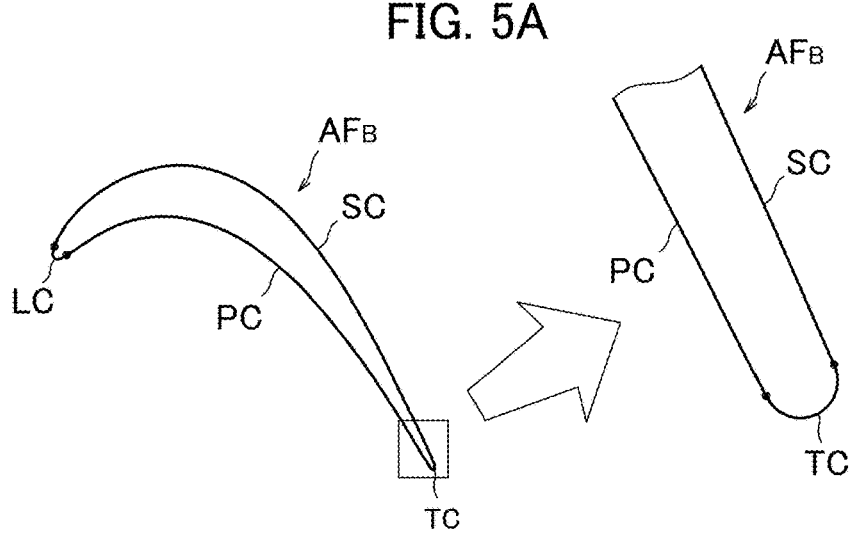
FIG. 5A is a view for explaining the blade modified by the method of the embodiment of the present disclosure, illustrating an airfoil of each modified blade in a spanwise region where no elevated portion is provided.
Figure 5B:
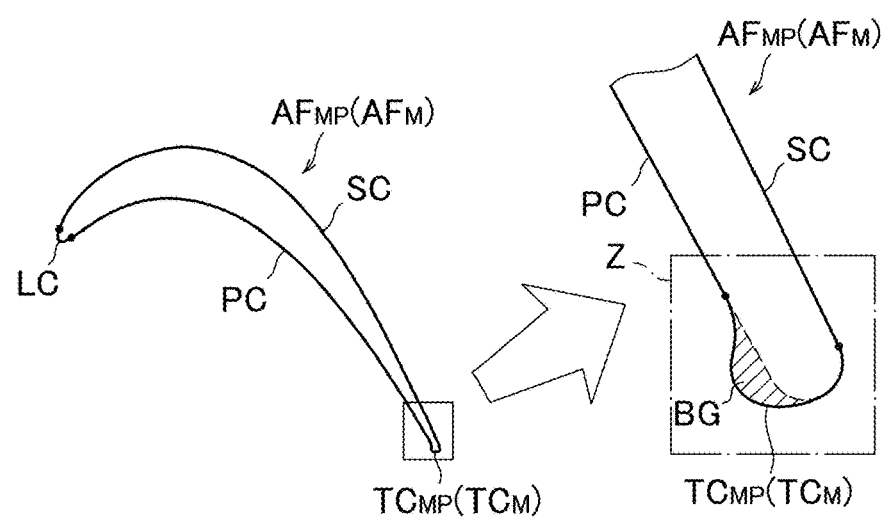
FIG. 5B is a view for explaining the blade modified by the method of the embodiment of the present disclosure, illustrating an airfoil of each modified blade in a spanwise region where a pressure-side elevated portion is provided.
Figure 5C:
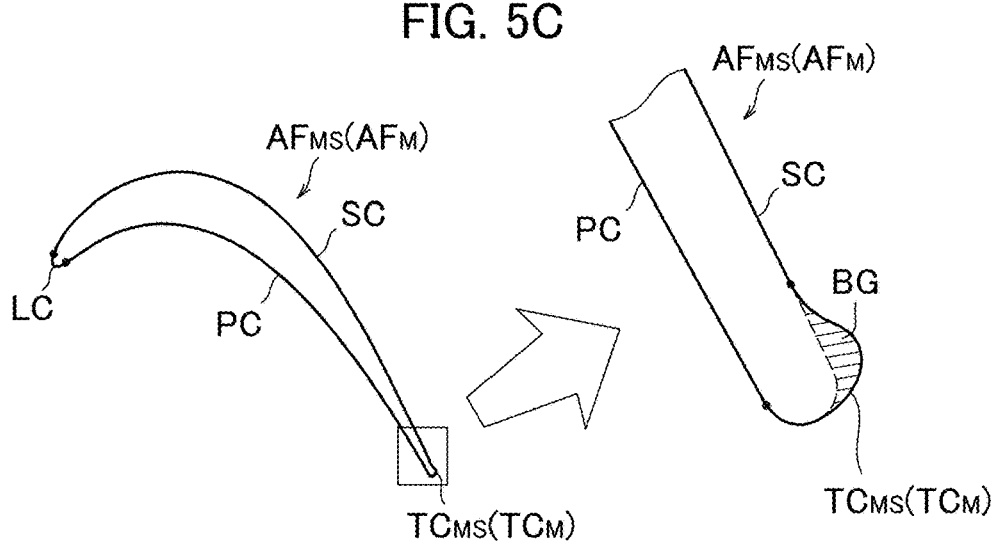
FIG. 5C is a view for explaining the blade modified by the method of the embodiment of the present disclosure, illustrating an airfoil of each modified blade in a spanwise region where a suction-side elevated portion is provided.

FIG. 5A illustrates the airfoil of each modified blade A ($A_1$, $A_2$) in a spanwise region where no elevated portion is provided, FIG. 5B illustrates the airfoil of each modified blade A ($A_1$, $A_2$) in a spanwise region where the pressure-side elevated portion EPP is provided, and FIG. 5C illustrates the airfoil of each modified blade A ($A_1$, $A_2$) in a spanwise region where the suction-side elevated portion EPS is provided.

As illustrated in FIGS. 4A and 4B, the modified blade A (first modified blade $A_1$ and second modified blade $A_2$) has a shape in which the suction-side elevated portion EPS is added to the suction surface SS near the trailing edge of the base blade $A_B$ in a region (blade-end-side tip region TRe) of the tip region TR adjacent to the channel outer wall TW, and the pressure-side elevated portion EPP is added to the pressure surface PS near the trailing edge of the base blade $A_B$ in a region (midspan-side tip region TRm) of the tip region TR closer to the blade center (hub region HR) than the blade-end-side tip region TRe.

In the example illustrated in the drawing, the shape of the pressure-side elevated portion EPP is common to the first modified blade A and the second modified blade $A_2$. On the other hand, the shape of the suction-side elevated portion EPS is different between the first modified blade $A_1$ and the second modified blade $A_2$ as illustrated in the drawing. The difference in the shape of the suction-side elevated portion EPS will be described later.

In the modified blade A, the elevated portions (pressure-side elevated portion EPP and suction-side elevated portion EPS) can be added not only to the tip region TR but also to the hub region HR. In this case, the suction-side elevated portion EPS is added to a region (blade-end-side hub region) of the hub region HR adjacent to the channel inner wall HW, and the pressure-side elevated portion EPP is added to a region (midspan-side hub region) of the hub region HR closer to the blade center (tip region TR) than the blade-end-side hub region. In addition, the modified blade A may have an elevated portion only in one of the tip region TR and the hub region HR.

In the modified blade A obtained by adding the elevated portion to the base blade $A_B$, the base blade $A_B$ is a part of the modified blade A and is not an independent blade. Therefore, when the configuration of the modified blade A is described, the expression of the base blade part $A_B$ will also be used. In this case, it can be said that the analysis by the CFD described above is performed on a blade row made up solely of the base blade parts $A_B$ (excluding the elevated portions) of the modified blades A.

As illustrated in FIG. 5A, the modified blade A has (the same airfoil as) the base airfoil $AF_B$ illustrated in FIG. 1C in the spanwise region where no elevated portion is provided.

On the other hand, in the spanwise region where the pressure-side elevated portion EPP is provided (the midspan-side tip region TRm and midspan-side hub region) and in the spanwise region where the suction-side elevated portion EPS is provided (the blade-end-side tip region TRe and the blade-end-side hub region), the modified blade A has a modified airfoil $AF_M$ having the following feature with respect to the combination of the configuration curves (cf. FIGS. 5B and 5C).

That is, the modified airfoil $AF_M$ is formed of the leading-edge curve LC, a modified trailing-edge curve $TC_M$, and the concave pressure-side curve PC and the convex suction-side curve SC each extending between the leading-edge curve LC and the modified trailing-edge curve $TC_M$. Note that the modified airfoil $AF_M$ and the modified trailing-edge curve $TC_M$ in the spanwise region where the pressure-side elevated portion EPP is provided will be referred to as a modified pressure-surface airfoil $AF_{MP}$ and a modified pressure-surface trailing-edge curve $TC_{MP}$, respectively (cf. FIG. 5B). Similarly, the modified airfoil $AF_M$ and the modified trailing-edge curve $TC_M$ in the spanwise region where the suction-side elevated portion EPS is provided will be referred to as a modified suction-surface airfoil $AF_{MS}$ and a modified suction-surface trailing-edge curve $TC_{MS}$, respectively (cf. FIG. 5C).

Here, the leading-edge curve LC, the pressure-side curve PC (in the case of the modified pressure-surface airfoil $AF_{MP}$, a portion in front of the connection point with the modified pressure-surface trailing-edge curve $TC_{MP}$ to be described later), and the suction-side curve SC (in the case of the modified suction-surface airfoil $AF_{MS}$, a portion in front of the connection point with the modified suction-surface trailing-edge curve $TC_{MS}$ to be described later) of the modified airfoil $AF_M$ (modified pressure-surface airfoil $AF_{MP}$ and modified suction-surface airfoil $AF_{MS}$) are the same curves as the leading-edge curve LC, the pressure-side curve PC, and the suction-side curve SC of the base airfoil $AF_B$ at the corresponding spanwise positions, respectively.

Figure 6A:
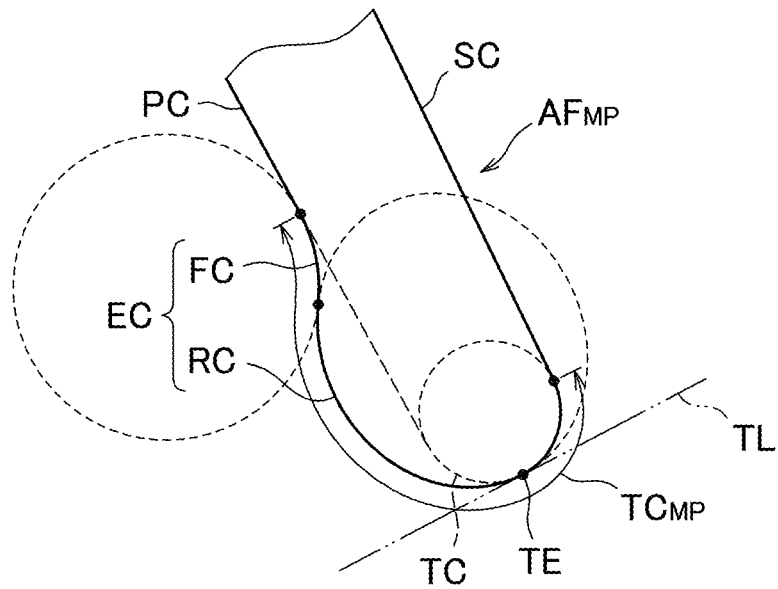
FIG. 6A is a view for explaining a modified trailing-edge curve (modified pressure-surface trailing-edge curve) forming a modified airfoil (modified pressure-surface airfoil) (an enlarged view of a Z portion in FIG. 5B), illustrating a case where a rear-side curve forming the elevated portion curve of the modified pressure-surface trailing-edge curve is an ellipse.
Figure 6B:
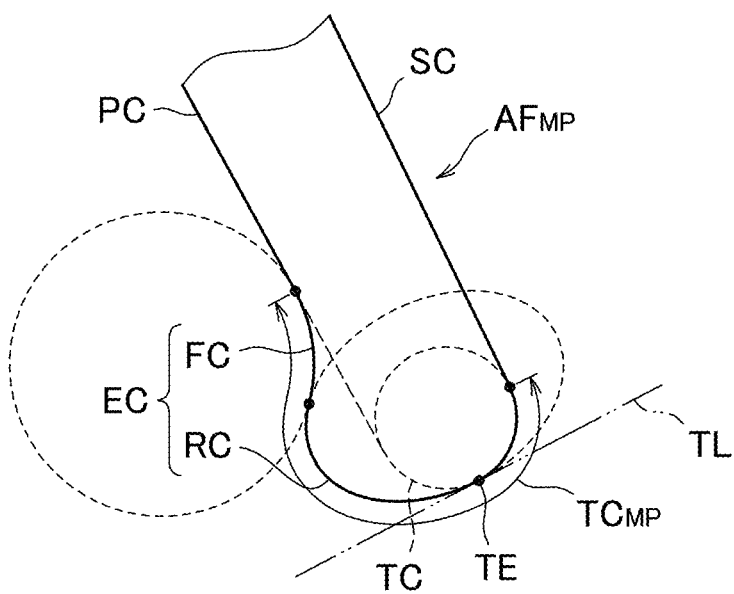
FIG. 6B is a view for explaining a modified trailing-edge curve (modified pressure-surface trailing-edge curve) forming a modified airfoil (modified pressure-surface airfoil) (an enlarged view of the Z portion in FIG. 5B), illustrating a case where the rear-side curve forming the elevated portion curve of the modified pressure-surface trailing-edge curve is an ellipse.
Figure 6C:
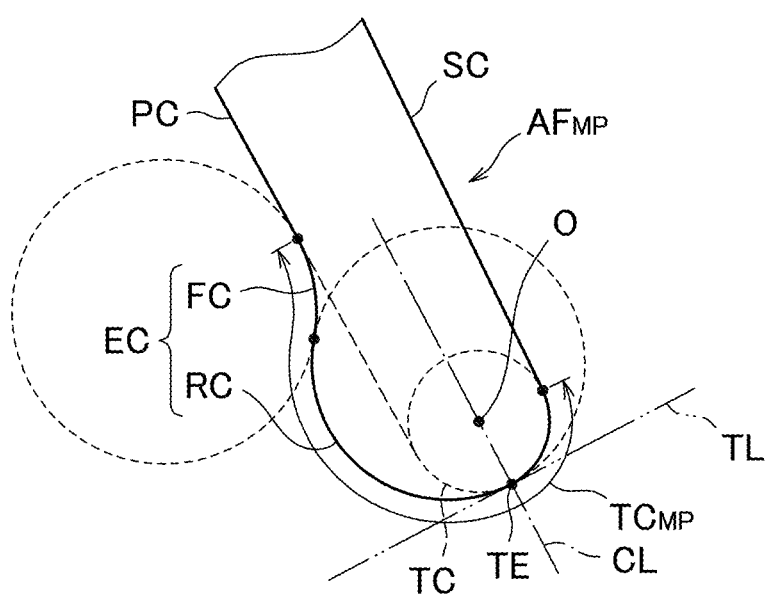
FIG. 6C is a view for explaining a modified trailing-edge curve (modified pressure-surface trailing-edge curve) forming a modified airfoil (modified pressure-surface airfoil) (an enlarged view of the Z portion in FIG. 5B), illustrating a case where the trailing-side curve forming the elevated portion curve of the modified pressure-surface trailing-edge curve is a circle.

Next, the modified pressure-surface trailing-edge curve $TC_{MP}$ of the modified trailing-edge curve $TC_M$ will be described in detail below with reference to FIGS. 6A to 6C, which are enlarged views of a Z portion in FIG. 5B. In FIGS. 6A to 6C, the curve forming the base airfoil $AF_B$ is indicated by a long-dashed line, and the curve forming the modified airfoil $AF_M$ (modified pressure-surface airfoil $AF_{MP}$) is indicated by a solid line, but the portion where both curves are the same is indicated by a solid line.

As illustrated in FIGS. 6A to 6C, in the modified pressure-surface trailing-edge curve $TC_{MP}$, the suction-side curve SC side with the trailing edge TE as a boundary is configured as the same curve as the trailing-edge curve TC of the base airfoil $AF_B$, that is, an arc, and the pressure-side curve PC side is configured as an elevated portion curve EC.

The elevated portion curve EC is formed of a concave front-side curve FC and a convex rear-side curve RC.

The rear-side curve RC may be a part of an ellipse or a circle and may be any of the following (1) to (3).
(1) A part of an ellipse, the ellipse satisfying the following conditions: the major axis has the trailing edge TE as an endpoint and is orthogonal to an imaginary straight line TL tangent to the trailing-edge curve TC (arc) of the base airfoil $AF_B$ at the trailing edge TE, and the minor diameter is larger than the diameter of the arc forming the trailing-edge curve TC of the base airfoil $AF_B$ (cf. FIG. 6A).
(2) A part of an ellipse, the ellipse satisfying the following conditions: the minor axis has the trailing edge TE as an endpoint and is orthogonal to an imaginary straight line TL tangent to the trailing-edge curve TC (arc) of the base airfoil $AF_B$ at the trailing edge TE, and the major diameter is larger than the diameter of the arc forming the trailing-edge curve TC of the base airfoil $AF_B$ (cf. FIG. 6B).
(3) A part of a circle, the circle satisfying the following conditions: the center is located on a straight line CL passing through the trailing edge TE and the center O of the arc forming the trailing-edge curve TC of the base airfoil $AF_B$, and the diameter is larger than the diameter of the arc forming the trailing-edge curve TC of the base airfoil $AF_B$ (cf. FIG. 6C).

However, in a case where the elevated portions are provided in both the tip region TR and the hub region HR, only one of (1) to (3) above is selected as the rear-side curve RC of the pressure-side elevated portion EPP.

On the other hand, the front-side curve FC may be any curve as long as the curve smoothly connects the pressure-side curve PC of the base airfoil $AF_B$ and the rear-side curve RC described above. As an example, the front-side curve FC can be a part of a circle (i.e., an arc) tangent to both the pressure-side curve PC and the rear-side curve RC of the base airfoil $AF_B$, as illustrated in FIGS. 6A to 6C.

With the elevated portion curve EC thus configured, the modified pressure-surface airfoil $AF_{MP}$ has a bulge BG toward the pressure surface side near the trailing edge TE as compared with the base airfoil $AF_B$ (cf. FIG. 5B). The bulge BG in the modified pressure-surface airfoil $AF_{MP}$ corresponds to the pressure-side elevated portion EPP added to the base blade $A_B$.

Here, the shape parameter (the major and minor diameters in the case of ellipses, and the diameter in the case of a circle) of the rear-side curve RC forming the modified pressure-surface trailing-edge curve $TC_{MP}$ of the modified pressure-surface airfoil $AF_{MP}$ are selected in consideration of the shape of the base airfoil $AF_B$ and the flow conditions (Reynolds number, etc.) around the base blade $A_B$ such that a desired effect can be obtained with respect to the increase in the outflow angle. Further, the shape parameter is a parameter representing the height of the pressure-side elevated portion EPP (the amount of elevation of the modified blade A in the thickness direction), and by continuously changing the shape parameter in the spanwise direction, it is possible to obtain the pressure-side elevated portion EPP with its height smoothly changing in the spanwise direction. Note that the shape parameter of the front-side curve FC (the diameter of an arc when the curve FC is formed as the arc) is selected such that the flow in the local concave portion formed by the front-side curve FC is smooth.

While the modified pressure-surface trailing-edge curve $TC_{MP}$ of the modified trailing-edge curve $TC_M$ has been described above with reference to FIGS. 6A to 6C, the modified suction-surface trailing-edge curve $TC_{MS}$ is configured in the same manner as the modified pressure-surface trailing-edge curve $TC_{MP}$.

That is, in the description of the modified suction-surface trailing-edge curve $TC_{MS}$, the modified pressure-surface airfoil $AF_{MP}$, the modified pressure-surface trailing-edge curve $TC_{MP}$, the pressure-side elevated portion EPP, the pressure-side curve PC, and the suction-side curve SC are respectively replaced with the modified suction-surface airfoil $AF_{MS}$, the modified suction-surface trailing-edge curve $TC_{MS}$, the suction-side elevated portion EPS, the suction-side curve SC, and the pressure-side curve PC, in the description of the modified pressure-surface trailing-edge curve $TC_{MP}$.

Next, the difference in the shape of the elevated portion between the first modified blade $A_1$ and the second modified blade $A_2$ will be described below with reference to FIG. 7. Here, for simplicity, a case where the elevated portion is provided only in the tip region TR will be described.

Figure 7:
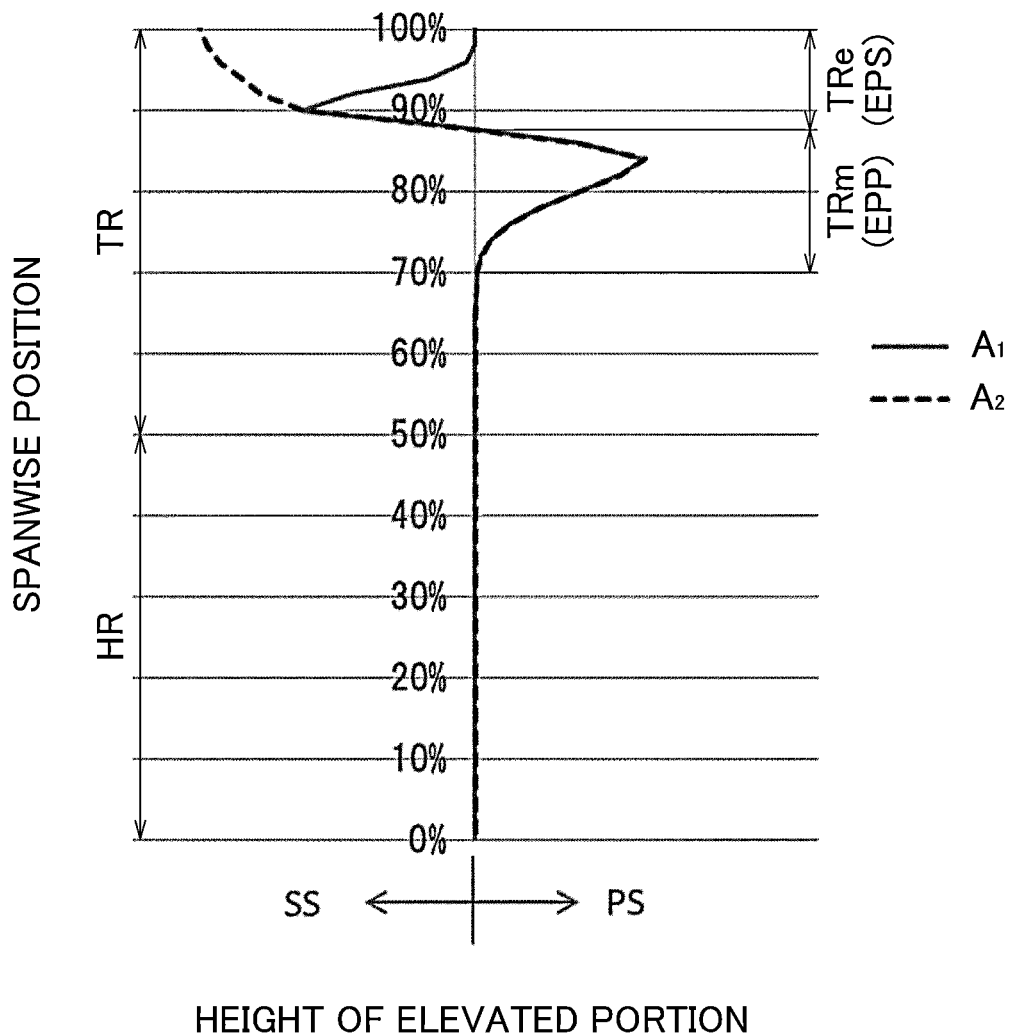
FIG. 7 is a view illustrating the spanwise distribution of the height of the elevated portion in the blade modified by the method of the embodiment of the present disclosure.

FIG. 7 is a view illustrating the spanwise distribution of the height of each elevated portion (pressure-side elevated portions EPP and suction-side elevated portions EPS) in the two types of modified blades $A_1$, $A_2$.

First, in both the first modified blade $A_1$ and the second modified blade $A_2$, the pressure-side elevated portion EPP is provided in a region of 70 to 88% span position (midspan-side tip region TRm), and its height is the maximum at the 84% span position. This is intended to maximize the height of the pressure-side elevated portion EPP at a spanwise position where the outflow angle is minimal below the design value in the base blade $A_B$.

Next, in the first modified blade $A_1$, the suction-side elevated portion EPS is provided in a region of 88 to 100% span position (blade-end-side tip region TRe), and its height is the maximum at the 90% span position. This is intended to maximize the height of the suction-side elevated portion EPS at a spanwise position where the outflow angle is maximal above the design value in the base blade $A_B$. The shape of the elevated portion of the first modified blade A thus configured is as illustrated in FIG. 4A.

Meanwhile, the second modified blade $A_2$ is also provided with the suction-side elevated portion EPS in the region of 88 to 100% span position (blade tip region TRe), but its height is 0 at the 88% span position (the midspan-side end of the blade tip region TRe) and monotonically increases from there to the 100% span position (the blade-end-side end of the blade-end-side tip region TRe; the outer end of the tip region TR). This assumes a simplified model in which the effect of the secondary flow is larger at a position closer to the channel outer wall TW. The shape of the elevated portion on the second modified blade $A_2$ thus configured is as illustrated in FIG. 4B.

As illustrated in FIG. 2, it can be seen that in the first modified blade A configured as described above, the outflow angle increases at the approximately 84% span position of the tip region TR where the outflow angle of the base blade $A_B$ is much smaller than the design value, and at the same time, the outflow angle decreases at the approximately 90% span position of the tip region TR where the outflow angle of the base blade $A_B$ is much larger than the design value, whereby the deviation of the outflow angle from the design value is corrected as a whole.

In a case where the modification according to the method of the embodiment of the present disclosure described above is applied to the newly designed base blade $A_B$, the modified blade A can be obtained by newly manufacturing a blade having a configuration in which the elevated portions (pressure-side elevated portions EPP and suction-side elevated portions EPS) are added to at least one of the hub region HR and the tip region TR of the base blade $A_B$ by an arbitrary method. Naturally, the modified blade A can also be obtained by newly manufacturing the base blade $A_B$ by an arbitrary method, and then adding the elevated portions (pressure-side elevated portion EPP and suction-side elevated portion EPS) to at least one of the hub region HR and the tip region TR of the base blade $A_B$ by an appropriate method such as welding. In a case where the modification according to the method of the embodiment of the present disclosure is applied to an existing blade as the base blade $A_B$, the latter of the two methods described above may be adopted.

In the above description, as a means for obtaining the spanwise distribution of the outflow angle in the base blade $A_B$, the flow analysis in the inter-blade channel by CFD considering the effect of viscosity has been mentioned. However, for example, in a case where the modification according to the method of the embodiment of the present disclosure is applied to an existing blade as the base blade $A_B$, a blade row test using the existing blade may be performed to obtain the spanwise distribution of the outflow angle by actual measurement when doing so is determined to be more convenient than the analysis by CFD.

To summarize the method for modifying a blade according to an embodiment of the present disclosure described above, the method includes the following steps. However, the following description corresponds to a case where the elevated portions (pressure-side elevated portions EPP and suction-side elevated portions EPS) are provided only in the tip region TR.

(1) A base blade $A_B$ to be modified is determined. Here, the base blade $A_B$ has the base airfoil $AF_B$ formed of the leading-edge curve LC, the trailing-edge curve TC that is an arc, and the concave pressure-side curve PC and the convex suction-side curve SC each extending between the leading-edge curve LC and the trailing-edge curve TC at each spanwise position.

(2) In order to optimize the outflow angle in the base blade $A_B$, when the pressure-side elevated portion EPP is provided on the pressure surface PS near the trailing edge TE and the suction-side elevated portion EPS is provided on the suction surface SS in the tip region TR of the base blade $A_B$, the spanwise regions in which these elevated portions are to be provided (the midspan-side tip region TRm and the blade-end-side tip region TRe, respectively) are determined.

(3-1) The airfoil of the base blade $A_B$ in the midspan-side tip region TRm is changed from the base airfoil $AF_B$ to the modified pressure-surface airfoil $AF_{MP}$. Here, the modified pressure-surface airfoil $AF_{MP}$ is obtained by changing the trailing-edge curve TC of the base airfoil $AF_B$ in the midspan-side tip region TRm to the modified pressure-surface trailing-edge curve $TC_{MP}$. In the modified pressure-surface trailing-edge curve $TC_{MP}$, the suction-side curve SC side with the trailing edge TE as a boundary is configured as the same curve as the trailing-edge curve TC of the base airfoil $AF_B$ in the midspan-side tip region TRm, that is, an arc, and the pressure-side curve PC side is configured as the elevated portion curve EC. The elevated portion curve EC is formed of the concave front-side curve FC and the convex rear-side curve RC.

(3-2) The airfoil of the blade-end-side tip region TRe of the base blade $A_B$ is changed from the base airfoil $AF_B$ to the modified suction-surface airfoil $AF_{MS}$. Here, the modified suction-surface airfoil $AF_{MS}$ is obtained by changing the trailing-edge curve TC of the base airfoil $AF_B$ in the blade-end-side tip region TRe to the modified suction-surface trailing-edge curve $TC_{MS}$. In the modified suction-surface trailing-edge curve $TC_{MS}$, the pressure-side curve PC side with the trailing edge TE as a boundary is configured as the same curve as the trailing-edge curve TC of the base airfoil $AF_B$ in the blade-end-side tip region TRe, that is, an arc, and the suction-side curve SC side is configured as an elevated portion curve EC. The elevated portion curve EC is formed of the concave front-side curve FC and the convex rear-side curve RC.

Here, each of the rear-side curve RC and the front-side curve FC in (3-1) and (3-2) is defined as follows.

The rear-side curve RC is one of the following (A) to (C).

(A) A part of an ellipse that has a major axis having the trailing edge TE as an endpoint and being orthogonal to an imaginary straight line TL tangent to the trailing-edge curve TC of the base airfoil $AF_B$ at the trailing edge TE, and has a minor diameter being larger than the diameter of the arc forming the trailing-edge curve TC of the base airfoil $AF_B$.

(B) A part of an ellipse that has a minor axis having the trailing edge TE as an endpoint and being orthogonal to an imaginary straight line TL tangent to the trailing-edge curve TC of the base airfoil $AF_B$ at the trailing edge TE, and has a major diameter being larger than the diameter of the arc forming the trailing-edge curve TC of the base airfoil $AF_B$.

(C) A part of a circle that has a center located on a straight line passing through the trailing edge TE and the center of the arc forming the trailing-edge curve TC of the base airfoil $AF_B$, and has a diameter larger than the diameter of the arc forming the trailing-edge curve TC of the base airfoil $AF_B$.

The front-side curve FC is a curve smoothly connecting the rear-side curve RC and the pressure-side curve PC.

The spanwise regions in which the elevated portions are to be provided (the midspan-side tip region TRm and the blade-end-side tip region TRe) in (2) are determined as follows.

(2-1) For the base blade row made up of the base blades $A_B$, the spanwise distribution of the outflow angle is obtained by the flow analysis in the inter-blade channel using CFD considering the effect of viscosity or by actual measurement in a blade row test.

(2-2) A spanwise position where the outflow angle, obtained in (2-1) is minimal below the design value, is obtained.

(2-3) The spanwise distribution of the height of the pressure-side elevated portion EPP is determined so as to be maximum at the spanwise position obtained in (2-2) and to smoothly decrease to 0 on both sides of the spanwise position. In this distribution, the spanwise region where the height of the pressure-side elevated portion EPP is not 0 is the midspan-side tip region TRm.

(2-4) A spanwise position where the outflow angle obtained in (2-1) is maximal above the design value is obtained.

(2-5) The spanwise distribution of the height of the suction-side elevated portion EPS is determined so as to be maximum at the spanwise position obtained in (2-4) and to smoothly decrease to 0 on both sides of the spanwise position. In this distribution, the spanwise region in which the height of the suction-side elevated portion EPS is not 0 is the blade-end-side tip region TRe.

Note that the description of (2-5) corresponds to the first modified blade $A_1$, and when the second modified blade $A_2$ is to be obtained, the spanwise distribution of the height of the suction-side elevated portion EPS may be such that the height is 0 at the blade-end-side end of the midspan-side tip region TRm obtained in (2-3) (the most tip region TR side) and monotonically increases from there toward the outer end (100% span position) of the tip region TR.

Here, the spanwise distribution of the heights of the elevated portions (pressure-side elevated portions EPP and suction-side elevated portions EPS) is realized by distributing the shape parameter of the rear-side curve RC (the minor diameter of an ellipse in the case of (A), the major diameter of an ellipse in the case of (B), and the diameter of a circle in the case of (C)) in the spanwise direction.

The shape of the blade A modified by the method described above is as follows. However, the following description corresponds to a case where the elevated portions (pressure-side elevated portions EPP and suction-side elevated portions EPS) are provided only in the tip region TR.

The blade A includes: the base blade part $A_B$; the suction-side elevated portion EPS provided on the suction surface SS near the trailing edge TE in the blade-end-side tip region TRe of the base blade part $A_B$; and the pressure-side elevated portion EPP provided on the pressure surface PS near the trailing edge TE in a region (midspan-side tip region TRm) closer to the blade center (hub region HR) than the blade-end-side tip region TRe of the base blade part $A_B$. That is, the suction-side elevated portions EPS and the pressure-side elevated portions EPP are not provided in the same spanwise region.

The base blade part $A_B$ has the base airfoil $AF_B$ formed of the leading-edge curve LC, the trailing-edge curve TC that is an arc, and the concave pressure-side curve PC and the convex suction-side curve SC each extending between the leading-edge curve LC and the trailing-edge curve TC at each spanwise position.

The modified blade A has the base airfoil $AF_B$ in a spanwise region where no elevated portion (pressure-side elevated portion EPP or suction-side elevated portion EPS) is provided, and has the modified airfoil $AF_M$ (modified pressure-surface airfoil $AF_{MP}$ and modified suction-surface airfoil $AF_{MS}$) in a spanwise region where the elevated portion (pressure-side elevated portion EPP and suction-side elevated portion EPS) is provided.

The modified airfoil $AF_M$ (modified pressure-surface airfoil $AF_{MP}$ and modified suction-surface airfoil $AF_{MS}$) is formed of the leading-edge curve LC, the pressure-side curve PC (a portion in front of the connection point with the modified pressure-surface trailing-edge curve $TC_{MP}$ in the modified pressure-surface airfoil $AF_{MP}$), and the suction-side curve SC (a portion in front of the connection point with the modified suction-surface trailing-edge curve $TC_{MS}$ in the modified suction-surface airfoil $AF_{MS}$) of the base airfoil $AF_B$ in the spanwise region where the elevated portion (pressure-side elevated portions EPP and suction-side elevated portions EPS) is provided, and the modified trailing-edge curve $TC_M$ (modified pressure-surface trailing-edge curve $TC_{MP}$ and modified suction-surface trailing-edge curve $TC_{MS}$).

The modified pressure-surface trailing-edge curve $TC_{MP}$ is formed of a portion of the trailing-edge curve TC of the base airfoil $AF_B$ in the midspan-side tip region TRm, which is closer to the suction-side curve SC than the trailing edge TE, and the elevated portion curve EC.

The modified suction-surface trailing-edge curve $TC_{MS}$ is formed of a portion of the trailing-edge curve TC of the base airfoil $AF_B$ in the blade-end-side tip region TRe, which is closer to the pressure-side curve PC than the trailing edge TE, and the elevated portion curve EC.

The elevated portion curve EC is formed of a concave front-side curve FC and a convex rear-side curve RC.

Here, each of the rear-side curve RC and the front-side curve FC are defined as follows.

The rear-side curve RC is one of the following (A) to (C).

(A) A part of an ellipse that has a major axis having the trailing edge TE as an endpoint and being orthogonal to an imaginary straight line TL tangent to the trailing-edge curve TC of the base airfoil $AF_B$ at the trailing edge TE, and has a minor diameter being larger than the diameter of the arc forming the trailing-edge curve TC of the base airfoil $AF_B$.

(B) A part of an ellipse that has a minor axis having the trailing edge TE as an endpoint and being orthogonal to an imaginary straight line TL tangent to the trailing-edge curve TC of the base airfoil $AF_B$ at the trailing edge TE, and has a major diameter being larger than the diameter of the arc forming the trailing-edge curve TC of the base airfoil $AF_B$.

(C) A part of a circle that has a center located on a straight line passing through the trailing edge TE and the center of the arc forming the trailing-edge curve TC of the base airfoil $AF_B$, and has a diameter larger than the diameter of the arc forming the trailing-edge curve TC of the base airfoil $AF_B$.

The front-side curve FC is a curve smoothly connecting the rear-side curve RC and the pressure-side curve PC.

In addition, the height of the pressure-side elevated portion EPP has a distribution such that the height is maximum at a spanwise position where the outflow angle of the blade row made up solely of the base blades $A_B$ is minimal below the design value and decreases smoothly to 0 on both sides of the spanwise position. On the other hand, the height of the suction-side elevated portion EPS has a distribution (in the case of the first modified blade $A_1$) such that the height is maximum at a spanwise position where the outflow angle of the blade row made up solely of the base blades $A_B$ is maximal above the design value and smoothly decreases to 0 on both sides of the spanwise position, or has a distribution (in the case of the second modified blade $A_2$) such that the height is 0 at the midspan-side end of the blade-end-side tip region TRe and monotonically increases from there toward the 100% span position (the blade-end-side end of the blade-end-side tip region TRe; the outer end of the tip region TR).

When the aerodynamic design of the base blade is changed in order to optimize the outflow angle of the base blade, the structural strength analysis needs to be performed again for the shape after the change to confirm that the shape satisfies the structural strength design requirements. When the shape after the change does not satisfy the structural strength design requirements, aerodynamic analysis and structural strength analysis need to be repeatedly performed while the shape is changed each time in order to obtain a shape that satisfies both the aerodynamic design requirements (i.e., optimization of the outflow angle) and the structural strength design requirements, which requires a great deal of time.

On the other hand, according to the method for modifying the blade in the embodiment of the present disclosure, only by adding the elevated portions (pressure-side elevated portion and suction-side elevated portion) to the base blade, it is possible to optimize the outflow angle substantially in the entire hub region and tip region, particularly in the blade-end-side hub region and the blade-end-side tip region, and it is possible to avoid spending much time for repeatedly performing aerodynamic analysis and structural strength analysis because there is no need to change the aerodynamic design of the base blade.

Further, the method for modifying the blade according to the embodiment of the present disclosure is not limited to a newly designed blade but can also be applied to an existing blade.

ASPECTS OF PRESENT DISCLOSURE

A blade for a fan, a compressor, or a turbine of axial-flow type according to a first aspect of the present disclosure includes: a base blade part having a tip region including a blade-end-side tip region and a midspan-side tip region located closer to a blade center than the blade-end-side tip region, and a hub region including a blade-end-side hub region and a midspan-side hub region located closer to the blade center than the blade-end-side hub region; a suction-side elevated portion provided on a suction surface near a trailing edge in at least one of the blade-end-side tip region and the blade-end-side hub region of the base blade part; and a pressure-side elevated portion provided on a pressure surface near the trailing edge in at least one of the midspan-side tip region and the midspan-side hub region of the base blade part. The base blade part has a base airfoil including a leading-edge curve, a trailing-edge curve that is an arc, and a concave pressure-side curve and a convex suction-side curve each extending between the leading-edge curve and the trailing-edge curve at each of spanwise positions. The blade has the base airfoil in a spanwise region where neither the suction-side elevated portion nor the pressure-side elevated portion is provided, a modified suction-surface airfoil in a spanwise region where the suction-side elevated portion is provided, and a modified pressure-surface airfoil in a spanwise region where the pressure-side elevated portion is provided. The modified suction-surface airfoil includes the leading-edge curve, the pressure-side curve and the suction-side curve of the base airfoil in the spanwise region where the suction-side elevated portion is provided, and a modified suction-surface trailing-edge curve. The modified pressure-surface airfoil includes the leading-edge curve, the pressure-side curve and the suction-side curve of the base airfoil in the spanwise region where the pressure-side elevated portion is provided, and a modified pressure-surface trailing-edge curve. The modified suction-surface trailing-edge curve includes a portion of the trailing-edge curve of the base airfoil in the spanwise region where the suction-side elevated portion is provided, the portion being closer to the suction-side curve than the trailing edge, and an elevated portion curve. The modified pressure-surface trailing-edge curve includes a portion of the trailing-edge curve of the base airfoil in the spanwise region where the pressure-side elevated portion is provided, the portion being closer to the suction-side curve than the trailing edge, and an elevated portion curve. The elevated portion curve includes a concave front-side curve and a convex rear-side curve.

In a blade according to a second aspect of the present disclosure, the rear-side curve is a part of an ellipse or a circle, and the front-side curve smoothly connects the rear-side curve and the pressure-side curve.

In a blade according to a third aspect of the present disclosure, the rear-side curve is a part of an ellipse that has a major axis having the trailing edge as an endpoint and being orthogonal to an imaginary straight line tangent to the trailing-edge curve of the base airfoil at the trailing edge, the ellipse having a minor diameter larger than a diameter of an arc forming the trailing-edge curve of the base airfoil, a part of an ellipse that has a minor axis having the trailing edge as an endpoint and being orthogonal to an imaginary straight line tangent to the trailing-edge curve of the base airfoil at the trailing edge, the ellipse having a major diameter larger than the diameter of the arc forming the trailing-edge curve of the base airfoil, or a part of a circle that has a center located on a straight line passing through the trailing edge and a center of the arc forming the trailing-edge curve of the base airfoil, the circle having a diameter larger than the diameter of the arc forming the trailing-edge curve of the base airfoil.

In a blade according to a fourth aspect of the present disclosure, the pressure-side elevated portion has a height distributed in the spanwise direction, and the distribution of the height is such that the height is maximum at a spanwise position where an outflow angle of a blade row made up solely of base blade parts, each being the base blade part, is below a design value and is minimal, and the height smoothly decreases to 0 on both sides of the spanwise position.

In a blade according to a fifth aspect of the present disclosure, the suction-side elevated portion has a height distributed in the spanwise direction, and the distribution of the height is such that the height is maximum at a spanwise position where the outflow angle of the blade row made up solely of the base blade parts is maximal above the design value, and the height smoothly decreases to 0 on both sides of the spanwise position.

In a blade according to a sixth aspect of the present disclosure, the suction-side elevated portion has a height distributed in the spanwise direction, and the distribution of the height is such that the height is 0 at a blade-center-side end of the blade-end-side tip region and monotonically increases from the blade-center-side end of the blade-end-side tip region toward the blade-end-side end of the blade-end-side tip region.

In a blade according to a seventh aspect of the present disclosure, the hub region is a region in which a distance from a hub-side end of the base blade part is 0 to 50% of a total span of the base blade part, and the tip region is a region in which a distance from a tip-side end of the base blade part is 0 to 50% of the total span of the base blade part.

A method for modifying a blade of a fan, a compressor or a turbine of axial-flow type according to a first aspect of the present disclosure, the method including: (1) a step of determining a base blade to be modified, the base blade being provided with a base airfoil including a leading-edge curve, a trailing-edge curve that is an arc, and a concave pressure-side curve and a convex suction-side curve each extending between the leading-edge curve and the trailing-edge curve at each of spanwise positions; (2) a step of determining a spanwise region in which a pressure-side elevated portion is to be provided on a pressure surface near a trailing edge and a spanwise region in which a suction-side elevated portion is to be provided on a suction surface near the trailing edge in at least one of a hub region and a tip region of the base blade at a time of providing the respective elevated portions in order to optimize an outflow angle in the base blade; and (3) a step of changing an airfoil of the base blade in the spanwise region where the pressure-side elevated portion is to be provided in the base blade from the base airfoil to a modified pressure-surface airfoil, and changing an airfoil of the base blade in the spanwise region where the suction-side elevated portion is to be provided in the base blade from the base airfoil to a modified suction-surface airfoil. The modified pressure-surface airfoil is obtained by changing the trailing-edge curve of the base airfoil in the spanwise region where the pressure-side elevated portion is to be provided to a modified pressure-surface trailing-edge curve. The modified suction-surface airfoil is obtained by changing the trailing-edge curve of the base airfoil in the spanwise region where the suction-side elevated portion is to be provided to a modified suction-surface trailing-edge curve. The modified pressure-surface trailing-edge curve has, with the trailing edge as a boundary, the suction-side curve side formed as the same curve as the trailing-edge curve of the base airfoil in the spanwise region where the pressure-side elevated portion is to be provided, and the pressure-side curve side formed as an elevated portion curve. The modified suction-surface trailing-edge curve has, with the trailing edge as a boundary, the pressure-side curve side formed as the same curve as the trailing-edge curve of the base airfoil in the spanwise region where the suction-side elevated portion is to be provided, and the suction-side curve side formed as an elevated portion curve. The elevated portion curve includes a concave front-side curve and a convex rear-side curve.

In a method according to a second aspect of the present disclosure, the suction-side elevated portion has a height distributed in the spanwise direction, and the distribution of the height is such that the height is maximum at a spanwise position where an outflow angle of a blade row made up solely of base blade parts, each being the base blade part, is maximal above a design value, and the height smoothly decreases to 0 on both sides of the spanwise position.

In a method according to a third aspect of the present disclosure, the suction-side elevated portion has a height distributed in the spanwise direction, and the distribution of the height is such that the height is 0 at a blade-center-side end of the blade-end-side tip region and monotonically increases from the blade-center-side end of the blade-end-side tip region toward the blade-end-side end of the blade-end-side tip region.

EXPLANATION OF REFERENCE SIGNS

A blade
$A_B$ base blade (or base blade part)
$AF_B$ base airfoil
$AF_{MP}$ modified pressure-surface airfoil
$AF_{MS}$ modified suction-surface airfoil
EC elevated portion curve
EPP pressure-side elevated portion
EPS suction-side elevated portion
FC front-side curve
HR hub region
LC leading-edge curve
PC pressure-side curve
PS pressure surface
RC trailing-side curve
SC suction-side curve
SS suction surface
TC trailing-edge curve
$TC_{MP}$ modified pressure-surface trailing-edge curve
$TC_{MS}$ modified suction-surface trailing-edge curve
TE trailing edge
TR tip region
TRe blade-end-side tip region
TRm midspan-side tip region

The invention claimed is:

1. A blade for a fan, a compressor, or a turbine of axial-flow type, the blade comprising:
a base blade part having a tip region including a blade-end-side tip region and a midspan-side tip region located closer to a blade center than the blade-end-side tip region, and a hub region including a blade-end-side hub region and a midspan-side hub region located closer to the blade center than the blade-end-side hub region;
a suction-side elevated portion provided on a suction surface near a trailing edge in at least one of the blade-end-side tip region and the blade-end-side hub region of the base blade part; and
a pressure-side elevated portion provided on a pressure surface near the trailing edge in at least one of the midspan-side tip region and the midspan-side hub region of the base blade part,
the base blade part having a base airfoil including a leading-edge curve, a trailing-edge curve that is an arc, and a concave pressure-side curve and a convex suction-side curve each extending between the leading-edge curve and the trailing-edge curve at each of spanwise positions,
wherein
the blade has
the base airfoil in a spanwise region where neither the suction-side elevated portion nor the pressure-side elevated portion is provided,
a modified suction-surface airfoil in a spanwise region where the suction-side elevated portion is provided, and
a modified pressure-surface airfoil in a spanwise region where the pressure-side elevated portion is provided,
the modified suction-surface airfoil includes the leading-edge curve, the pressure-side curve and the suction-side curve of the base airfoil in the spanwise region where the suction-side elevated portion is provided, and a modified suction-surface trailing-edge curve,
the modified pressure-surface airfoil includes the leading-edge curve, the pressure-side curve and the suction-side curve of the base airfoil in the spanwise region where the pressure-side elevated portion is provided, and a modified pressure-surface trailing-edge curve,
the modified suction-surface trailing-edge curve includes a portion of the trailing-edge curve of the base airfoil in the spanwise region where the suction-side elevated portion is provided, the portion being closer to the pressure-side curve than the trailing edge, and an elevated portion curve,
the modified pressure-surface trailing-edge curve includes a portion of the trailing-edge curve of the base airfoil in the spanwise region where the pressure-side elevated portion is provided, the portion being closer to the suction-side curve than the trailing edge, and an elevated portion curve, and
the elevated portion curves include a concave front-side curve and a convex rear-side curve.

2. The blade according to claim 1, wherein
the rear-side curve is a part of an ellipse or a circle, and
the front-side curve smoothly connects the rear-side curve and the pressure-side curve.

3. The blade according to claim 2, wherein the rear-side curve is
a part of an ellipse that has a major axis having the trailing edge as an endpoint and being orthogonal to an imaginary straight line tangent to the trailing-edge curve of the base airfoil at the trailing edge, the ellipse having a minor axis longer than a diameter of an arc forming the trailing-edge curve of the base airfoil,
a part of an ellipse that has a minor axis having the trailing edge as an endpoint and being orthogonal to an imaginary straight line tangent to the trailing-edge curve of the base airfoil at the trailing edge, the ellipse having a major axis longer than the diameter of the arc forming the trailing-edge curve of the base airfoil, or
a part of a circle that has a center located on a straight line passing through the trailing edge and a center of the arc forming the trailing-edge curve of the base airfoil, the circle having a diameter larger than the diameter of the arc forming the trailing-edge curve of the base airfoil.

4. The blade according to claim 1, wherein
the pressure-side elevated portion has a height distributed in the spanwise direction, and
the distribution of the height is such that the height is maximum at a spanwise position where an outflow angle of a blade row made up solely of base blade parts, each being the base blade part, is minimal below a design value, and the height smoothly decreases to 0 on both sides of the spanwise position.

5. The blade according to claim 4, wherein
the suction-side elevated portion has a height distributed in the spanwise direction, and
the distribution of the height is such that the height is maximum at a spanwise position where the outflow angle of the blade row made up solely of the base blade parts is maximal above the design value, and the height smoothly decreases to 0 on both sides of the spanwise position.

6. The blade according to claim 4, wherein
the suction-side elevated portion has a height distributed in the spanwise direction, and
the distribution of the height is such that the height is 0 at a blade-center-side end of the blade-end-side tip region and monotonically increases from the blade-center-side end of the blade-end-side tip region toward the blade-end-side end of the blade-end-side tip region.

7. The blade according to claim 1, wherein
the hub region is a region in which a distance from a hub-side end of the base blade part is 0 to 50% of a total span of the base blade part, and
the tip region is a region in which a distance from a tip-side end of the base blade part is 0 to 50% of the total span of the base blade part.

8. A method for modifying a blade of a fan, a compressor, or a turbine of axial-flow type, the method comprising:
(1) a step of determining a base blade to be modified, the base blade being provided with a base airfoil including a leading-edge curve, a trailing-edge curve that is an arc, and a concave pressure-side curve and a convex suction-side curve each extending between the leading-edge curve and the trailing-edge curve at each of spanwise positions;
(2) a step of determining a spanwise region in which a pressure-side elevated portion is to be provided on a pressure surface near a trailing edge and a spanwise region in which a suction-side elevated portion is to be provided on a suction surface near the trailing edge in at least one of a hub region and a tip region of the base blade at a time of providing the respective elevated portions in order to optimize an outflow angle in the base blade; and
(3) a step of changing an airfoil of the base blade in the spanwise region where the pressure-side elevated portion is to be provided in the base blade from the base airfoil to a modified pressure-surface airfoil, and changing an airfoil of the base blade in the spanwise region where the suction-side elevated portion is to be provided in the base blade from the base airfoil to a modified suction-surface airfoil,
wherein
the modified pressure-surface airfoil is obtained by changing the trailing-edge curve of the base airfoil in the spanwise region where the pressure-side elevated portion is to be provided to a modified pressure-surface trailing-edge curve,
the modified suction-surface airfoil is obtained by changing the trailing-edge curve of the base airfoil in the spanwise region where the suction-side elevated portion is to be provided to a modified suction-surface trailing-edge curve,
the modified pressure-surface trailing-edge curve has, with the trailing edge as a boundary, the suction-side curve side formed as the same curve as the trailing-edge curve of the base airfoil in the spanwise region where the pressure-side elevated portion is to be provided, and the pressure-side curve side formed as an elevated portion curve,
the modified suction-surface trailing-edge curve has, with the trailing edge as a boundary, the pressure-side curve side formed as the same curve as the trailing-edge curve of the base airfoil in the spanwise region where the suction-side elevated portion is to be provided, and the suction-side curve side formed as an elevated portion curve, and
the elevated portion curve includes a concave front-side curve and a convex rear-side curve.

9. The method according to claim 8, wherein
the suction-side elevated portion has a height distributed in the spanwise direction, and
the distribution of the height is such that the height is maximum at a spanwise position where an outflow angle of a blade row made up solely of base blade parts, each being the base blade part, is maximal above a design value, and the height smoothly decreases to 0 on both sides of the spanwise position.

10. The method according to claim 8, wherein
the suction-side elevated portion has a height distributed in the spanwise direction, and
the distribution of the height is such that the height is 0 at a blade-center-side end of the blade-end-side tip region and monotonically increases from the blade-center-side end of the blade-end-side tip region toward the blade-end-side end of the blade-end-side tip region.

* * * * *